United States Patent Office 2,959,754
Patented Nov. 8, 1960

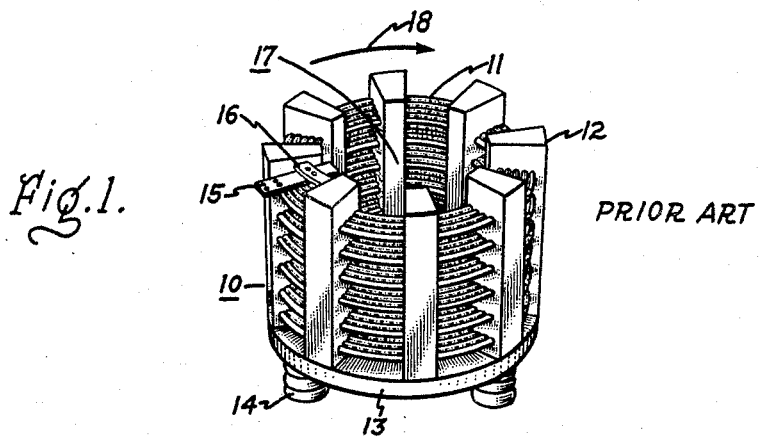
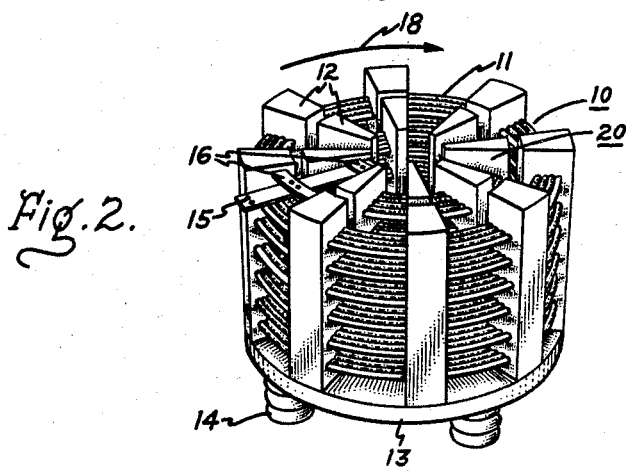
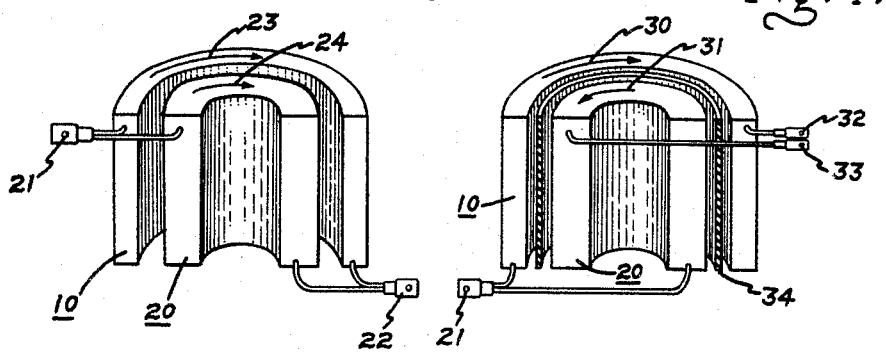

2,959,754

ELECTRICAL REACTOR

Lloyd J. MacKinnon, Guelph, Ontario, and Anthony B. Trench, Kitchener, Ontario, Canada, assignors to Canadian General Electric Company Limited, Toronto, Ontario, Canada, a corporation of Canada Filed Dec. 24, 1957, Ser. No. 704,980

1 Claim. (Cl. 336—185)

This invention relates to electrical reactors and more particularly to air-core type reactors of high current rating such as used for the protection of electrical power systems and apparatus.

As is well-known in the electrical art, current-limiting reactors are essentially inductive coils which are serially inserted in a circuit in order to present an adequate impedance to excessive current flowing therein without however causing any appreciable wastage of power under normal current conditions. When used for protection of circuit breakers reactors are also effective to reduce the breaker cost since they reduce the fault-current-interrupting rating required of the breaker. The reactors used in protecting electrical power transmission and distribution systems and their associated apparatus (e.g. transformers, generators, circuit breakers) are known as power reactors and are generally of the air-core type. The term "air-core" denotes a reactor whose winding is wound on a non-magnetic core and under normal current conditions air-core reactors cause a minimum power loss and voltage drop in the line in which they are connected.

Where power reactors are required to have a high current rating their respective phase windings are often divided into two or more identical paralleled sections whose conductors are thus of a gauge or cross section sufficiently small to be readily wound. Such multisection windings will hence forth be referred to as "split-windings" and may of course be employed in any of the several standard types of reactors such as three-phase, single-phase, or duplex. The invention is particularly adapted to duplex type reactors which consist essentially of an inductive coil divided into dual windings by means of a central input tap, it being understood that such dual windings may each be split-windings if desired. A pair of electrical loads may be connected by leads (or feeders) to the respective ends of the dual windings of such duplex reactors. These dual windings are located in close proximity to one another and are interconnected such that their mutual inductance opposes their respective self inductances whereby the overall reactance presented to the system by a duplex reactor is relatively small under normal current conditions but increases should a fault occur on one of the feeders. It should be noted that whereas in the dual windings of a duplex reactor the mutual inductance subtracts from the self-inductances, an additive relationship exists between the respective self and mutual inductances of the individual sections of a split-winding.

Several factors must be taken into consideration in the electrical design of a reactor. For instance the overall inductance is the algebraic sum of the self and mutual inductances and in order to save conductor turns it is desirable that a minimum proportion of self-inductance be employed, since self-inductance varies with the square of the number of turns. Such a reduction in self-inductance can be achieved by close electromagnetic intercoupling of the turns to increase the mutual inductance and thus utilize the existing turns to maximum advantage.

Hence mutually additive intercoupling between turns or sections of the same phase is desirable since it increases the fault-current-limiting inductive effect without recourse to additional turns. Mutual intercoupling between phases is usually undesirable however as it increases line voltage drop under normal current conditions without providing correspondingly increased protection, since the occurrence of a fault on any one line may alter the coupling to the remaining lines, whereby their reactance to subsequent fault current has an indefinite value. Where a certain amount of such interphase coupling is unavoidable, it should at least be symmetrical in order that the lines do not become unbalanced during normal operation.

From a structural viewpoint it is desirable that a reactor be mechanically robust, since when carrying current a reactor winding experiences magnetic forces in a direction tending to increase its reactance. In the case of a series-wound cylindrical coil this phenomenon results in a tendency to axial shortening combined with radial enlargement and such coils are generally reinforced against such tendencies as by embedment in concrete.

Three-phase reactors presently employed have often been built up from three single-phase reactors, each consisting essentially of a cylindrical coil wound on a separate core. These cylindrical windings have been variously positioned with respect to one another such as by stacked vertically in coaxial juxtaposed relationship, by arranging in tandem, or by placing in laterally adjacent relationship such that they occupy the vertices of an equilateral triangle. Duplex reactors, as previously mentioned, consist essentially of an inductive coil divided by means of a centre tap into dual windings of mutually opposing polarity. Duplex reactors customarily adopt the vertically stacked layout since this is essentially equivalent to a long solenoid which may readily be centre-tapped.

There are disadvantages inherent in each of the above three layouts however. The vertically juxtaposed construction is intended to conserve floor space but provides a reactor of inordinate height. The equilateral and tandem layouts conserve height but demand increased floor area. Furthermore none of the above three layouts permit the desired close intercoupling between the sections of a split-winding, or between the dual windings of a duplex reactor, (whether each of these dual windings is of split-winding construction or not). In view of the above shortcomings the current ratings presently employed represent the permissible limit of such reactor layouts, these layouts being found to be economically unsuitable for higher current ratings. Where a current rating higher than customary requires that split-windings be resorted to, it is economically futile to merely stack the discrete sections of the split-winding together in one of the aforementioned layouts in forming a phase. Single-section phase windings of contemporary rating are already some five or six feet tall and of a similar diameter and if these ratings have to be exceeded such that the phase winding must be split, the resulting discrete sections, if conventionally assembled, will certainly occupy considerably greater volume per phase than at present. The resulting floor space or height would clearly be excessive, necessitating expensive additional buswork (with its associated insulators and reinforcement means) to interconnect all the relatively widely separated winding sections. The resulting excessively loose coupling would also result in exceptionally low mutual inductance and hence uneconomical use of conductor material in the form of additional self-inductance producing turns. Furthermore, with either the juxtaposed or tandem layouts, unsymmetrical coupling would arise due to the fact that the winding sections situated at the extremities of such a multisection winding are subject to intercoupling from sections situated to one side only and therefore have less mutual intercoupling than the centrally disposed sections which are influenced simultaneously by sections situated adjacent both their sides. The centrally disposed sections would therefore operate either at less than their full capacity, thereby constituting a certain amount of wasted conductor material or else, when operated at their full capacity, would cause overloading of the endmost sections of the winding.

It will be evident from the foregoing remarks that presently employed power reactors suffer from a number of undesirable features due mainly to employment of unsatisfactory layouts which cause excessive bulk with present ratings, prohibitive bulk where split windings must be resorted to, uneconomical utilization of conductor material and loose electromagnetic intercoupling between the component turns. It will be further evident that such shortcomings are attributable chiefly to lack of compactness and that reduction of a number of such shortcomings together with some saving in copper or other conductor material will result from a more compact reactor layout.

Accordingly a primary object of this invention is to provide an economical reactor construction which is more compact than formerly for a given rating.

It is a further object of this invention to provide a compact construction which is particularly suitable for embodiment in electrical reactors of the split-winding and duplex types.

Briefly stated, the invention resides in concentrically stacking the dual windings of a duplex reactor, or the sections of a phase of a split-winding reactor, thereby occupying the customarily vacant space along the coil central axis. This enables a substantial increase in rating for only slightly increased diameter in comparison with contemporary reactor layouts having the same height per phase.

While the specification concludes with claims particularly pointing out and distinctly claiming the subject matter which we regard as our invention, it is believed that the invention will be better understood from the following description taken in connection with the accompanying drawing.

In the drawing,

Fig. 1 is a perspective view of a phase winding construction as presently employed in electrical reactors and is intended to illustrate the prior art;

Fig. 2 is a perspective view of the improved phase winding construction of the invention;

Fig. 3 shows in simplified schematic form a cross section of the improved phase winding construction of the invention when applied to a phase of a split-winding type reactor;

Fig. 4 shows in simplified schematic form a cross section of the improved phase winding construction of the invention when applied to a duplex type reactor.

While this invention will be illustrated and described with reference to a cast-in-concrete reactor of the air-core type, embodying particular single-phase electrical interconnections of its component windings, it will be appreciated that this has been done for illustrative purposes only. The construction is by no means limited to such reactors but may employ other than the illustrated single-phase connections of its component winding sections, and may be advantageously applied to each phase of conventional three phase reactor layouts. Since as previously mentioned a reactor winding section is essentially an inductive coil, the terms "winding section" and "coil" are to be regarded as synonymous throughout the ensuing description.

With regard to the drawing there appears in Fig. 1 an inductive winding or coil 10 which typifies a single phase of presently employed concrete reactors, or a split-winding section thereof. As is well known, such a winding 10 comprises essentially a number of turns 11 of electrically conductive material such as copper or aluminum embedded in a plurality of concrete reinforcement posts 12. The assembled coil 10 may be secured to a concrete base 13 by means of bolts or rods (not shown) extending through the base into said posts.

Supporting insulators 14 are conventionally provided and may be attached to base 13 by similar bolt means. The necessary terminal lugs such as 15 are electrically connected in series with turns 11 and are generally retained in their desired positions as by attachment to bars 16, which can be readily anchored by embedment in posts 12 either during manufacture or subsequently. A relatively large central space or well 17 is usually left free of turns, partly to avoid the necessity of forming the heavy gauge turns 11 to a small radius of curvature and also because an increased turn diameter results in increased reactance for the same number of turns, thereby providing more efficient utilization of the turns. Arrow 18 shows the direction of wind of the turns 11 of coil 10, which for illustrative purposes has been shown as clockwise in Figs. 1 to 4.

The improved reactor construction of this invention appears in Fig. 2 as comprising windings or coils 10 and 20 which are arranged concentrically as shown such that winding 20 occupies the previously vacant space or well 17 occurring in winding 10. Windings 10 and 20 of Fig. 2 are generally similar in construction to winding 10 of Fig. 1 and utilize a common base 13 and insulators 14. Windings 10 and 20 are of separate and distinct construction to facilitate manufacture and are thus physically discrete with the exception of the common base 13 and terminals 15. When thus arranged concentrically, windings 10 and 20 are ideally disposed for parallel connection to form the sections of a split type winding. Preferably winding sections 10 and 20 coextend to the same height from base 13 as shown in order for instance to facilitate stacking as in forming the split-phases of large three-phase reactors. Preferably coils 10 and 20 are electrically equivalent, i.e. they have identical reactances and equal current capacity otherwise unequal current sharing would be liable to occur. Assuming for illustrative purposes that winding coil 10 is of substantially the same current rating in Fig. 2 as in Fig. 1, it will be seen that the split-winding reactor 10—20 of Fig. 2 has substantially the same overall height and diameter as the reactor of Fig. 1 but approximately double the rating. Moreover, the use of only a single common base and insulators achieves a slight weight and cost reduction over what would be expected for doubled rating. Normally the well 17 is not quite large enough and a slight increase in diameter of winding 10 over that shown in Fig. 1 is necessary to admit an electrically equivalent winding 20 as in Fig. 2. Such an increase is permissible since it represents only a small percentage increase in diameter in return for doubled rating. Moreover, as mentioned previously, such increase in diameter permits use of fewer turns to achieve the same reactance of winding 10. Roughly speaking, this saving in turns is somewhat offset by the fact that winding 20 is of decreased diameter in comparison with the coil 10 of Fig. 1 and therefore demands more turns to provide the same reactance. Consideration of diameters alone therefore is not too conclusive in respect of the net saving of turns provided by this concentric construction. However, the close coupling of coils 10 and 20 resulting from this construction provides greatly increased mutual reactance which as previously stated utilizes the reactance of existing turns to optimum advantage and thereby effects a substantial saving in the number of turns necessary to provide the desired reactance. This increased coupling more than compensates for the slight proportional increase in diameter of coil 10 which may be necessary to enable insertion of an electrically equivalent coil 20 thereinto as in Fig. 2. Naturally, it is equally possible to have coil 10 of other than the same rating as coil 20 although equal ratings were conveniently assumed for illustrative purposes in the foregoing, the point being that for any given rating the concentric reactor of Fig. 2 is more compact than the conventional reactor construction of Fig. 1. Such unequal ratings would be necessary where the gauges of the conductors forming the respective windings 10 and 20 were dissimilar. In such cases the respective reactances would have to be proportioned so as to share the total current in the ratio of the respective conductor gauges and so avoid overloading of the coil having the smaller gauge conductors. However it is preferable to use equally rated coils in order to minimize the computations involved in design and to achieve maximum compactness and standardization of conductor gauges.

Although the turns of each of windings 10 and 20 have been shown for illustrative purposes as cast in eight reinforcing posts 12 it is obviously possible to use any number of posts 12. It is also possible to use dissimilar numbers of posts 12 for the respective coils 10 and 20, the outside coil 10 generally being provided with the greater number of posts because of its greater periphery. In one concentric reactor similar to Fig. 2 fourteen posts 12 were provided for support of the outer coil 10 and ten posts were used for the inner coil 20, the sole criterion in distributing the posts being the provision of adequate bracing against electromechanical disruptive forces. Naturally the posts employed may be of insulative material other than concrete if desired.

The cross-sectional details of the improved, concentric winding layout, of Fig. 2 are shown in the schematic diagrams of Figs. 3 and 4 which have been drastically simplified for the sake of clarity. More particularly, Fig. 3 shows how the concentric winding sections 10 and 20 of the reactor of Fig. 2 may be electrically connected in parallel to form a split-winding and provide incoming and outgoing terminals 21 and 22 respectively, each of which is similar in construction to terminal of Figs. 1 and 2. It will be noted that this parallel connection is achieved by electrically strapping adjacent ends of the coils, the arrows 23 and 24 indicating that both coils are wound in the same sense (in this case illustrated as clockwise although both coils could be wound counterclockwise, with the same result). Thus coils 10 and 20 are seen to have mutually assisting polarities whereby their mutual inductance is effectively added to their self-inductances, thereby increasing the overall reactances as previously discussed. Naturally the same additive relationship of the respective polarities could be provided by winding one coil in a reverse sense with respect to the other and connecting incoming terminal 21 at the top face of one coil and the bottom of the other, the outgoing terminal 22 being similarly connected at the remaining respective faces of the coils 10 and 20. Although such reverse winding could easily be provided by inverting one of the coils with respect to the other, the extra bus-work required to connect from top to bottom etc. of the coils and the extra insulation required because of the differential voltage-gradient which would be introduced between the coils makes the proposition uneconomical especially as the connections etc. shown in Fig. 3 are found to be satisfactory.

When applied to a duplex reactor the improved layout of the invention takes the form shown in Fig. 4, in which the two windings 10 and 20, except for their electrical interconnections, are essentially windings 10 and 20 of Figs. 2 and 3. In this case however windings 10 and 20 are preferably reversely wound relative to one another as shown by the arrows 30 and 31 in Fig. 4. As previously mentioned such a reverse winding feature can be provided either by inverting one of two similarly wound coils or by initially winding one coil in an opposite sense to that of the other. The common incoming terminal 21 is made by electrically strapping one pair of adjacent ends of the coils, the remaining pair of leads 32 and 33 being taken out separately at the same level as shown, for convenient connection to their respective feeders. The arrangement just described provides that the coils 10 and 20 have a common centre tap 21 and opposing polarities and thus form the dual windings of a duplex type reactor. Naturally the requisite opposing polarities could also be provided by winding both of coils 10 and 20 in the same sense (as in Fig. 3) and then connecting the common input terminal 21 at the top face of one coil and the bottom face of the other coil, the remaining respective faces of the pair of coils being connected to the feeders as at 32 and 33. As with the split-winding reactor of Fig. 2 however, such connections do not appear to offer much advantage in view of the extra bus work required to extend between top and bottom of the coil pair and the fact that feeder leads 32 and 33 would not be taken off at the same level. It is by comparison far easier to merely invert one of the coils 10 or 20 to produce the reverse winding effect and then connect to the common input 21 at the same level, i.e. either to both bottom faces (as shown) or to both top faces of the coils 10 and 20 as mentioned above.

With either method of providing the opposed polarities inherent in a duplex reactor there exists potential differences between adjacently situated portions of the respective windings 10 and 20. Such potential differences may arise as due to load fluctuations or especially due to the potential gradient introduced when the common input 21 does not connect to both of coils 10 and 20 at the same level. Hence it is necessary in a duplex reactor to impose between coils 10 and 20 an insulative barrier 34 which may be of glass-reinforced polyester resin or any other suitable electrically insulative material. Although this barrier could be dispensed with by use of extra thick insulation on the turns 11 such a course is not considered convenient nor economical.

Irrespective of the method chosen to achieve mutual opposition of polarities of dual windings 10 and 20 of Fig. 4, the concentric disposition of this invention permits especially close coupling thereof, leading to a coupling factor in the region of 50% or better. The invention thus gives rise to coupling factors which are impossible of achievement with prior reactor layouts and for this reason is considered to offer particular advantages when applied to duplex type reactors.

Although from a technical viewpoint such close coupling is not necessary between the various sections of a split-winding, close coupling is certainly desirable in such applications from an economic standpoint, since, as explained previously, it results in a saving in the weight of conductor required. In such reactors this close coupling could also be achieved by electrically connecting sections 10 and 20 in series where the total current is not so large as to demand inordinately thick conductors. Although a phase winding split into only two sections 10 and 20 has been shown in Fig. 2 it is contemplated that three or even more concentric sections per phase may be resorted to if desired. As with prior layouts the individual phases so formed may be stacked in the juxtaposed coaxial layout or any other convenient layout dictated by space considerations. Whichever layout is adopted the overall reactor will be more compact than a conventional reactor which does not employ the concentrically-sectioned phase construction. Because of the undesirable effects of interphase coupling, concentric mounting of the three phases in building a three phase reactor is not contemplated, since to be practicable such a construction would demand an inordinate radial spacing of the phases.

It will therefore be evident that the invention provides a reactor of economical construction which enables close coupling to be achieved between sections of split-windings and duplex windings and is furthermore sufficiently compact to provide a substantial increase in rating over prior reactor structures of the same bulk.

It will be understood, of course, that, while the forms of the invention herein shown and described constitute preferred embodiments of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claim to cover all such changes as fall within the true spirit and scope of the invention.

What we claim as new and desire to secure by Letters Patent of the United States is:

An electrical power reactor comprising a reactor phase winding having a pair of mechanically discrete inner and outer winding sections electrically connected in parallel, said inner winding section being concentrically disposed within said outer winding section, each of said winding sections comprising a coil of electrically insulated conductor turns cast in concrete reinforcement parts, said winding sections being supported by a common base and being of the same axial height, said inner winding section having a greater number of conductor turns than said outer winding section, and said inner and outer winding sections having identical reactances and equal current capacity, whereby said inner and outer winding sections will equally share the current load on said winding.

References Cited in the file of this patent

UNITED STATES PATENTS

| | | |
|---|---|---|
| 1,317,003 | Creighton | Sept. 23, 1919 |
| 2,116,404 | Montsinger | May 3, 1938 |
| 2,449,434 | Whitman | Sept. 14, 1948 |
| 2,632,041 | Bilodeau | Mar. 17, 1953 |
| 2,756,397 | Cederstrom et al. | July 24, 1956 |
| 2,783,441 | Camilli et al. | Feb. 26, 1957 |